United States Patent
Fraser et al.

(10) Patent No.: US 12,182,902 B2
(45) Date of Patent: *Dec. 31, 2024

(54) CREATING SECURE PIPELINE CACHE OBJECTS USING DIFFERENTIAL PRIVACY TECHNIQUES

(71) Applicant: GOOGLE LLC, Mountain View, CA (US)

(72) Inventors: Robert Fraser, Waterloo (CA); Chetan Kakkar, Mountain View, CA (US); Derek Bulner, Belmont, CA (US); Jean-François Roy, San Francisco, CA (US); Kevin Moule, Kitchener (CA); Nicholas Deakin, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,974

(22) Filed: Jun. 16, 2023

(65) Prior Publication Data
US 2023/0325966 A1 Oct. 12, 2023

Related U.S. Application Data

(63) Continuation of application No. 17/482,550, filed on Sep. 23, 2021, now Pat. No. 11,727,531.

(51) Int. Cl.
*G06T 1/20* (2006.01)
*G06F 9/38* (2018.01)
*G06F 11/34* (2006.01)
*G06F 12/0855* (2016.01)
*G06T 1/60* (2006.01)
*G06T 15/00* (2011.01)

(52) U.S. Cl.
CPC .............. *G06T 1/60* (2013.01); *G06F 9/3869* (2013.01); *G06F 11/3428* (2013.01); *G06F 12/0855* (2013.01); *G06T 1/20* (2013.01); *G06T 15/005* (2013.01)

(58) Field of Classification Search
CPC .............. G06F 9/3867; G06F 11/3438; G06F 12/0855; G06F 12/0888; G06F 12/0875; G06F 12/0893; G06T 1/60; G06T 1/20; G06T 15/005
See application file for complete search history.

(56) References Cited

U.S. PATENT DOCUMENTS

| 2019/0308099 A1* | 10/2019 | Lalonde | G06T 1/20 |
| 2020/0147490 A1* | 5/2020 | Marr | A63F 13/55 |
| 2021/0312698 A1* | 10/2021 | He | G06V 10/454 |

* cited by examiner

*Primary Examiner* — Hau H Nguyen (57) ABSTRACT

A graphics pipeline cache reconstruction operation is implemented to reconstruct one or more graphics pipeline caches for a current client gaming session based on one or more pipeline structures. The pipeline structures each represent a graphical object rendered during a respective previous client gaming session and are used to reconstruct one or more graphics pipeline caches that include graphics pipeline cache objects related to the graphical objects of the pipeline structures. These graphics pipeline cache objects are used to initialize one or more graphics pipelines used to render the graphical objects in a gaming application for a current client gaming session.

20 Claims, 7 Drawing Sheets

CREATING SECURE PIPELINE CACHE OBJECTS USING DIFFERENTIAL PRIVACY TECHNIQUES

CROSS-REFERENCE TO RELATED APPLICATIONS

The present application is a continuation application of U.S. patent application Ser. No. 17/482,550, entitled "CREATING SECURE PIPELINE CACHE OBJECTS USING DIFFERENTIAL PRIVACY TECHNIQUES" and filed on Sep. 23, 2021, the entirety of which is incorporated by reference herein.

BACKGROUND

Cloud-based gaming platforms involve executing portions of or entire video game applications on remote servers to facilitate playing the video game application on a local client device. The remote servers provide rendered graphical objects and frames from executing video game applications as video streams over a network to the local client device. To render the graphical objects, the remote servers employ several graphics pipelines and use pipeline caches to help ensure performance.

In cloud-based gaming platforms, when a pipeline cache miss occurs, the player experience of the video game application may be degraded due to sputtering resulting from frames missing rendering deadlines. Additionally, the player experience of the video game application may be degraded due to the graphics pipeline compilation times resulting from a pipeline cache miss which can negatively impact load times. To help prevent these pipeline cache misses, exhaustive pipeline caches are generated. However, generating exhaustive pipeline caches is difficult as the data needed to build the exhaustive pipeline caches can require manually playing through an entire video game application with all possible user configurations.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Techniques and systems described herein address the demands of reducing graphical object rendering times. In particular, such techniques and systems described herein allow for reconstructing graphics pipeline caches for a current client gaming session of a gaming application based on pipeline structures generated during previous client gaming sessions of the gaming application. The pipeline structures each represent a graphical object rendered during a previous client gaming session. One or more graphics pipeline caches are reconstructed from the pipeline structures and each includes pipeline cache objects related to the previously rendered graphical objects. These pipeline cache objects are used to initialize one or more graphics pipelines used to render the graphical objects during the current client gaming session of the gaming application. Generating pipeline caches from pipeline structures in this way helps reduce the time needed to render the graphical objects during the current client gaming session, reducing the likelihood of frame sputtering.

Additionally, techniques and systems described herein address the needs for user privacy within a pipeline structure library that stores the pipeline structures generated during previous client gaming sessions. In particular, such techniques and systems described herein allow for only anonymized pipeline structures stored in the pipeline structure library to be used in the reconstruction of graphics pipeline caches. Such pipeline structures are anonymized, in part, by ensuring that a certain number of related pipeline structures associated with the same graphical object are in the pipeline structure library. In this way, the risk that one can determine identification information from a pipeline structure, such as information identifying a user, client device, or client gaming session, is reduced.

To facilitate understanding, the techniques of the present disclosure are described in the example context of a cloud-based gaming system. A cloud-based or other remote server renders one or more game frames by rendering graphical objects using a graphics pipeline cache reconstruction technique described herein. The server provides the rendered frames as part of a video stream representing the visual content of a video game instance being executed at that server or a related server. The server further encodes each frame to generate a bitstream representing a stream of encoded rendered game frames for transmission to one or more client systems via one or more networks. However, it will be appreciated that the systems and techniques described herein are not limited to this example context, but instead may be implemented in any of a variety of systems building pipelines (e.g., compute pipelines, raytracing pipelines, raycasting pipelines) using the guidelines provided herein.

Figure 1:
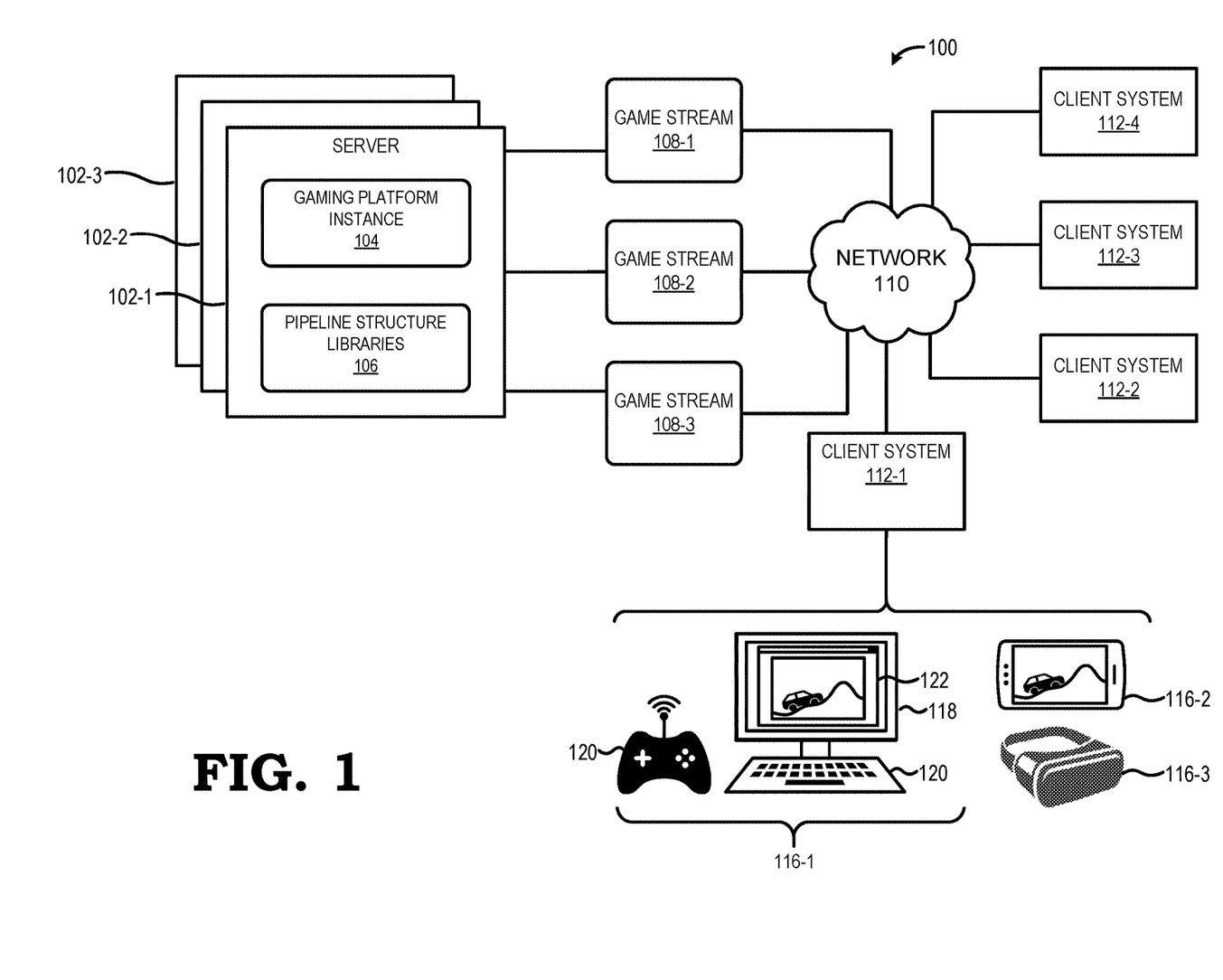
FIG. 1 is a block diagram of a cloud-based gaming system employing a graphics pipeline cache reconstruction technique, in accordance with some embodiments.

FIG. 1 illustrates a cloud-based gaming system 100 for single-player or multiplayer (including massively multiplayer) gaming, according to some embodiments. Cloud-based gaming system 100 includes one or more servers 102, with each server 102 communicatively coupled to one or more client systems 112 by at least one network 110.

Network 110 is configured to allow for the transmission and reception of data between any of servers 102 and client systems 112 and includes, for example, wired and wireless networks, such as Ethernet, the Internet, Wi-Fi, or any combination thereof. In embodiments, each server 102 is communicatively interconnected via a high-bandwidth, low-latency inter-server messaging bus. Servers 102 are typically distributed in one or more data centers over a geographical area so as to reduce transmission latency through physical proximity. Though in the illustrated embodiment, three servers 102-1, 102-2, and 102-3 are presented supporting four client systems 112-1, 112-2, 112-3, and 112-4, in other embodiments, any number of servers may be implemented supporting any number of client systems. It will be appreciated that in a typical real-world implementation, the quantity of servers 102 and quantity of client systems 112 typically will be considerably higher than presented in the example of FIG. 1.

In the depicted embodiment, each server 102 includes a computing device such as, for example, a cloud server, virtual server, or any combination thereof configured to support one or more client gaming sessions executed on one or more client systems 112. A "client gaming session" or "server-based gaming session", as used herein, includes a gaming application being played, partially simulated, or fully simulated on client system 112. Each server 102 is configured to support this client gaming session by executing a corresponding game platform instance 104 that facilitates the execution of at least a portion of the gaming application being played, partially simulated, or fully simulated on the client system 112. Such facilitation can include performing one or more operations related to the gaming application, such as, for example, rendering one or more frames related to the gaming application, performing calculations related to the gaming application (e.g., lighting calculations, artificial intelligence calculation, physics calculations, shading calculations, input calculations, and the like), providing access to files, or any combination thereof, to name a few. The game platform instance 104 provides various software and hardware resources to achieve such facilitation, such as communication/network management, resource management, media rendering encoding, and the like. In this way, game platform instance 104 simulates the execution of one or more operations of a gaming application for a corresponding player as though that gaming application was being played on a local gaming device, such as a personal computer ("PC"), game console, smartphone, tablet computer, automotive entertainment system, and the like.

Each client system 112 represents the hardware and software resources utilized to receive player input through manipulation of one or more input/output devices for at least one player, as well as to present the video and audio content representing the visual and auditory content, respectively, of the gameplay for the at least one player. Examples of a client system 112 include one or more desktop computers, notebook computers, tablet computers, virtual-reality systems, augmented reality systems, a compute-enabled cellular phone (i.e., a "smartphone"), a compute-enabled television (i.e., a "smart TV"), or any combination thereof, to name a few. As illustrated with reference to client system 112-1, each client system 112 includes one or more client devices 116. In the illustrated embodiment, client system 112-1 comprises a first client device 116-1, which is communicatively coupled to, or otherwise associated with, display 118, at least one input device 120 (e.g. a gamepad, joystick, keyboard, mouse, touchscreen), one or more network interfaces configured to couple to the network connecting the client system 112 to a corresponding server 102, one or more processors, memory, storage, speakers, and other computing resources to render, process, and display scenes of a virtual environment. Each client system 112 includes a decoder configured to decode one or more frames related to a virtual environment. Each decoder can include hardware and software configured to decode one or more encoding streams (e.g., game streams 108) received from servers 102 so as to produce a decoded set of frames or decoded stream. In embodiments, client system 112-1 further comprises a smartphone client device 116-2, and a wearable virtual reality client device 116-3, each of which may operate as an integrated mobile computing device having input facilities, output facilities, display facilities, and communication facilities analogous to those noted above with respect to client device 116-1. In certain embodiments, client devices 116-1, 116-2, and 116-3 may include one or more facilities such as accelerometers, Global Positioning System (GPS) devices, and the like that are used to acquire motion data representing movement of the client device, as well as a rate or acceleration of such movement.

While certain aspects described herein will be discussed with specific reference to cloud-based gaming scenarios, it will be appreciated that in certain embodiments the described techniques may be utilized in various non-gaming scenarios, such as if one or more of servers 102 and client systems 112 operate to render, process, and display other types of informational, educational, recreational and/or artistic content. It will therefore be further appreciated that while techniques are discussed herein with respect to the rendering of content that may utilize particular examples relevant to cloud-based gaming and gaming content, such discussions and techniques may be applied to such non-gaming scenarios. Examples provided herein may refer to scenarios involving the rendering, processing, and display of graphical objects due to frame sputtering and lag times relevant to such content and should not be construed to indicate that the techniques described are limited to those scenarios.

During operation, each server 102 executes a gaming platform instance 104 for one or more client gaming sessions of a gaming application. Executing game platform instance 104 includes generating, or rendering, one or more graphical objects associated with the gaming application being executed on one or more respective client systems 112. Each graphical object depicts at least a portion of a virtual environment used in the gaming application executed on the client system 112. For example, each graphical object can depict at least a portion of a virtual environment displayed on a display 118 of a client device 116 during the client gaming session or server-based gaming session. Each server 102 renders graphical objects using one or more graphics pipelines that each include data indicating one or more steps, stages, or instructions for the graphics hardware and software of server 102 to render the graphical objects. For example, a graphics pipeline includes data indicating one or more stages (e.g., geometry shader stage, tessellation stage, rasterization stage, color blending stage, or any combination thereof, to name a few) for server 102 to render a graphical object. Each server 102 includes one or more pipeline structure libraries 106 related to the gaming application that store one or more pipeline structures related to previous client gaming sessions of the gaming application. As an example, the pipeline structure libraries 106 include pipeline structures determined from graphics pipelines used during previous client sessions or server-based gaming sessions of the gaming application. Each server 102 is configured to construct one or more graphics pipeline caches based on one or more pipeline structures stored in the pipeline structure libraries 106. Before a new client gaming session is initiated for the gaming application, each server 102 initializes one or more graphics pipelines using the constructed graphics pipeline caches. In embodiments, during the new client gaming session, one or more graphics pipelines may skip compilation based on the constructed pipeline caches. Constructing graphics pipeline caches in this way helps to improve the performance of the new client gaming session of the gaming application by helping to reduce the time needed to render the graphical objects associated with the gaming application.

According to embodiments, each server 102 is configured to manage the data (i.e., pipeline structures) within each pipeline structure library 106 according to one or more privacy policies. A "privacy policy," as used herein, includes one or more requirements or processes for the pipeline structures stored in the pipeline structure library such as, for example, the anonymization of the pipeline structures, the periodic purging of pipeline structures, the comparison of pipeline structures to one or more predetermined thresholds, the grouping of pipeline structures, or any combination thereof, to name a few. As an example, pipeline structures within a pipeline structure library 106 are hashed and have identification information removed when stored in a pipeline structure library 106. As another example, a server 102 purges all pipeline structures within a pipeline structure library 106 periodically after a predetermined amount of time has elapsed.

Each server 102 is configured to combine one or more rendered graphical objects to render one or more gaming frames and encode each rendered gaming frame via an encoder so as to generate a respective encoded set of frames (also referred to herein as "game stream" 108). Each server 102 is configured to encode a game stream 108 through, for example, compression, reorganization, and manipulation of each frame rendered by gaming platform instance 104. In embodiments, each encoder of a server 102 implements one or more codecs so as to encode one or more rendered frames according to the one or more codecs. Such codecs can include H.264, H.265, VP9, AV1, or any combination thereof, to name a few. Each resulting game stream 108 corresponds to a gaming application being executed on one or more client systems 112 and is provided to these corresponding client systems via network 110. The corresponding client systems 112 are each configured to decode a received game stream 108 via a decoder and display the resulting decoded set of frames 122 on, for example, a display 118. Each client system 112 is configured to decode a respective game stream 108 by compression, reorganization, and manipulation of the frames within the encoded stream according to one or more various video codecs including lossless and lossy codecs. According to embodiments, each client system 112 includes a decoder that implements one or more codecs so as to decode a received game stream 108 according to the one or more codecs. Such codecs can include H.264, H.265, VP9, AV1, or any combination thereof, to name a few. Though three game streams 108-1, 108-2, 108-3 are depicted in the illustrated embodiment, in other embodiments, servers 102 can generate any number of game streams 108 each corresponding to one or more client gaming sessions or server-based gaming sessions.

Figure 2:
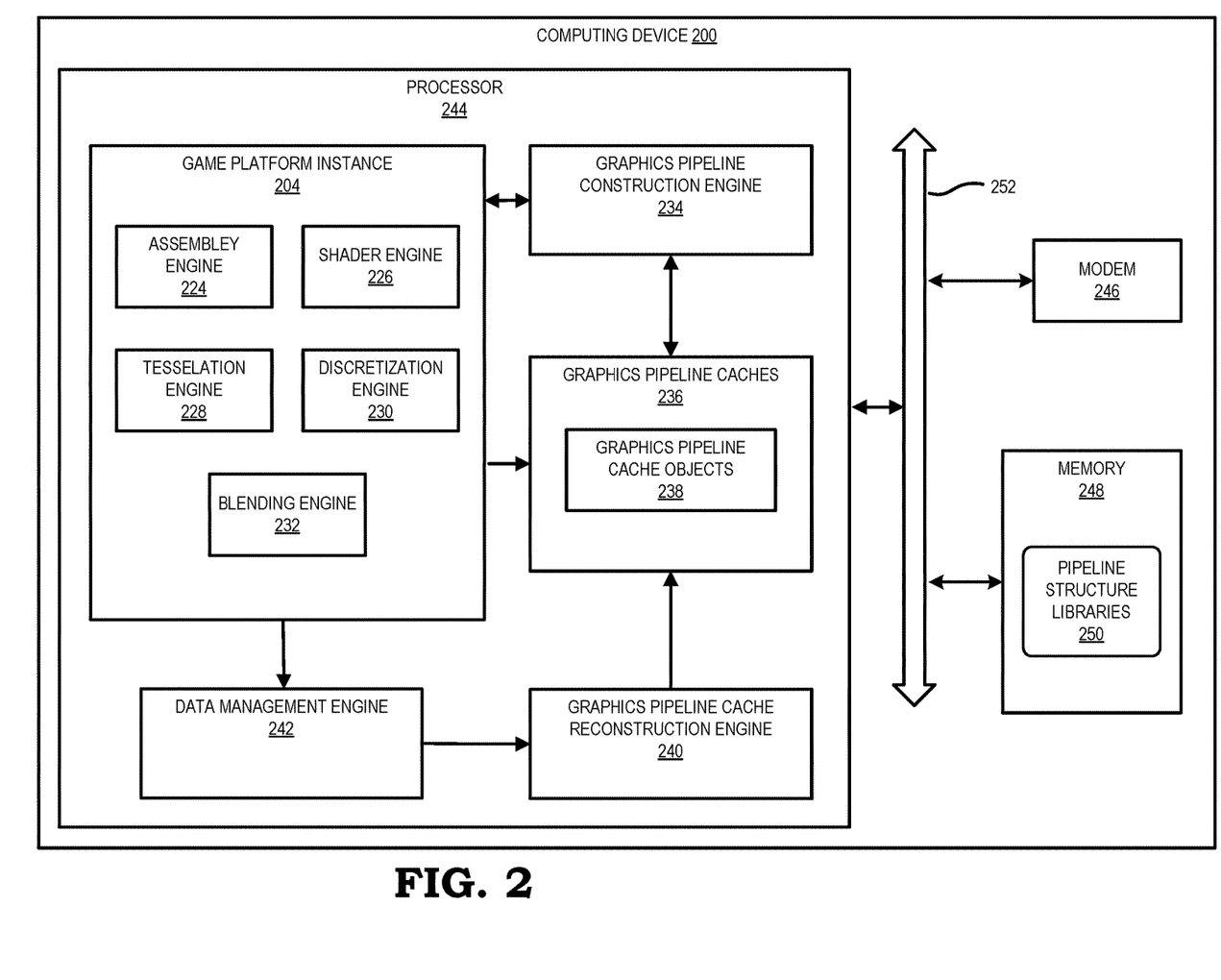
FIG. 2 is a block diagram of a computing device configured to reconstruct one or more graphics pipeline caches using a pipeline structure library, in accordance with some embodiments.

Referring now to FIG. 2, a computing device 200 configured to reconstruct one or more graphics pipeline caches using a pipeline structure library is illustrated. In embodiments, computing device 200 implements aspects of cloud-based gaming system 100 as described in FIG. 1. For example, computing device 200 may be similar or the same as a server 102 described in FIG. 1. Computing device 200 includes one or more software and hardware components for bi-directional communications including components for reconstructing one or more graphics pipeline caches 236. In some embodiments, computing device 200 is part of an electronic device that reconstructs one or more graphics pipeline caches 236 from a pipeline structure library, including, for example, a desktop computer, a notebook computer, a tablet, a server, a game console, to name a few. In embodiments, computing device 200 includes processor 244, modem 246, and memory 248. Memory 248 includes an electronic storage device, such as for example, a solid-state drive, a hard disk drive, random access memory ("RAM"), read-only memory ("ROM"), electronically erasable programmable ROM ("EEPROM"), optical storage device, or any combination thereof. Memory 248 includes instructions and data related to the operation of game platform instance 204, graphics pipeline construction engine 234, graphics pipeline cache reconstruction engine 240, and data management engine 242 such as, for example, pipeline structure library 250, gaming engines, gaming applications, constants, and the like. Modem 246 is configured to be communicatively coupled to one or more client systems 112 via a network 110 and further configured to transmit a game stream 108 to the one or more client systems 112. According to embodiments, processor 244, modem 246, and memory 248 are internally in electronic communication via one or more interfaces (e.g., a bus 252).

According to embodiments, processor 244 includes one or more control processing units ("CPUs"), microprocessors, field-programmable gate arrays ("FPGAs"), graphics processing units ("GPUs"), application-specific integrated circuits (ASICs), or any combination thereof and is configured to build one or more graphics pipelines to render one or more graphical objects for use in a client gaming session of a gaming application on cloud-based gaming system 100. Processor 244 operates to execute a game platform instance 204, the same or similar as game platform instance 104, associated with a current client gaming session and configured to support a gaming application executed on one or more client systems. Game platform instance 204 includes assembly engine 224, shader engine 226, tessellation engine 228, discretization engine 230, and blending engine 232 for rendering one or more graphical objects of the gaming application according to one or more graphics pipelines. Each rendered graphical object is associated with at least a portion of a virtual environment of the gaming application executed on the one or more client systems. For example, if the gaming application is a racing game, each rendered graphical object represents at least a portion of a racetrack, car, or surrounding area. In embodiments, the graphics pipelines each include data representing stages or steps for rendering one or more graphical objects on game platform instance 204. That is to say, a graphics pipeline includes one or more stages to be compiled by game platform instance 204 for rendering one or more graphical objects. Such stages include, for example, an input assembly stage, a vertex shading stage, a tessellation stage, a geometry shading stage, a rasterization stage, a fragment shading stage, a color blending stage, or any combination thereof. According to embodiments, a graphics pipeline further includes an ordering in which the stages are to be compiled so that one or more graphical objects are rendered. In embodiments, each of assembly engine 224, shader engine 226, tessellation engine 228, discretization engine 230, and blending engine 232 include graphics cores, processing cores, video random access memory (VRAM), GPUs, and the like, and are configured to support one or more stages of a graphics pipeline. Assembly engine 224 is configured to assemble primitive data (e.g., points, lines, triangles) into one or more primitive types (e.g., point lists, line lists, line strips, triangle lists, triangle strips). Shader engine 226 is configured to perform one or more graphical shader operations, such as, for example, vertex shaders, geometry shaders, fragment shaders, or any combination thereof. Tessellation engine 228 is configured to perform one or more tessellation operations. Discretization engine 230 is configured to perform one or more rasterization operations, one or more ray tracing operations, or both. Blending engine 232 is configured to perform one or more color blending operations.

In embodiments, processor 244 includes graphics pipeline construction engine 234 that includes hardware and software configured to build one or more graphics pipelines for game platform instance 204. According to embodiments, graphics pipeline construction engine 234 builds a graphics pipeline for rendering a graphical object in a virtual environment when that virtual environment is currently displayed by the gaming application running on a client device. For example, in response to a virtual environment including the graphical object being within a player's view (i.e., when the virtual environment is displayed by the gaming application) on a client device, graphics pipeline construction engine 234 builds a graphics pipeline to render the graphical object. In embodiments, graphics pipeline construction engine 234 is further configured to build one or more graphics pipelines based on one or more graphics pipeline cache objects 238 stored in a graphics pipeline cache 236. A pipeline cache object includes data generated when one or more stages of a graphics pipeline are compiled. For example, a graphics pipeline cache object 238 includes the data output by one or more stages of the graphics pipelines when it is compiled. As another example, a graphics pipeline cache object 238 includes a rendered graphical object resulting from a graphics pipeline being compiled. According to embodiments, graphics pipeline construction engine 234 initializes one or more graphics pipelines using one or more pipeline cache objects. In this way, initialized graphics pipelines can skip compilation helping to reduce the time needed to render each graphical object in the virtual environments displayed by the gaming application.

Graphics pipeline cache reconstruction engine 240 of processor 244 includes hardware and software configured to build one or more graphics pipeline caches 236 storing one or more graphics pipeline cache objects 238 based on one or more pipeline structures stored in pipeline structure library 250 associated with the gaming application. A "pipeline structure," as used here, is a data structure representing one or more graphical objects rendered during one or more previous client gaming sessions of the gaming application. That is to say, a pipeline structure includes a data structure representing graphical objects that were rendered during one or more previous client gaming sessions of the gaming application. In embodiments, graphical objects rendered by game platform instance 204 are stored in pipeline structure library 250 by data management engine 242. Data management engine 242 includes hardware and software configured to transmit, address, hash, encode, manage, erase, and store data. According to embodiments, data management engine 242 is configured to generate one or more representations of each rendered graphical object from game platform instance 204 with each representation including one or more data structures representing one or more graphics pipelines used to render the rendered graphical object. Data management engine 242 then serializes, hashes, or both each representation of a rendered graphical object to produce a pipeline structure. In embodiments, data management engine 242 is further configured to remove identification information from a pipeline structure. "Identification information," as used herein, includes data in a pipeline structure indicating a client gaming session, a client device (i.e., a client device associated with the client gaming session), a user (i.e., a user or player associated with the client gaming session), or any combination thereof associated with the generation of the pipeline structure.

Processor 244 includes graphics pipeline cache reconstruction engine 240 that includes hardware and software configured to construct one or more graphics pipeline caches 236 based on one or more pipeline structures from pipeline structure library 250. Graphics pipeline cache reconstruction engine 240 is configured to receive a pipeline structure associated with one or more graphical objects and build one or more graphics pipeline caches 236 that each include graphics pipeline cache objects 238 associated with the one or more graphical objects. In this way, graphics pipeline cache reconstruction engine 240 is configured to build graphics pipeline caches 236 and graphics pipeline cache objects 238 that are based on the compilation of a graphics pipeline during a previous client gaming session of a gaming application. In other words, graphics pipeline cache reconstruction engine 240 is configured to help reconstruct the graphics pipelines compiled during previous client gaming sessions of a gaming application. In embodiments, graphics pipeline construction engine 234 uses the graphics pipeline caches 236 built by graphics pipeline cache reconstruction engine 240 to initialize one or more graphics pipelines for use by game platform instance 204 to support a gaming application.

In embodiments, data management engine 242 is configured to manage the pipeline structures in the pipeline structure library 250 according to one or more privacy policies. For example, data management engine 242 is configured to manage the pipeline structures such that each pipeline structure is anonymized. "Anonymizing" a pipeline structure, as used herein, includes ensuring that the user information, client device information, and client gaming session information associated with the generation of the pipeline structure is not indicated by pipeline structure. For example, to ensure that the user information associated with the generation of a pipeline structure (i.e., information related to the user operating the client gaming session when the pipeline structure was generated) is not indicated, data management engine 242 determines the number of pipeline structures each associated with the same rendered graphical object (i.e., related pipeline structures) and compares this number to a predetermined, threshold number. In response to the number of related pipeline structures exceeding the threshold number, data management engine 242 makes these related pipeline structures available to graphics pipeline cache reconstruction engine 240. In response to the number of related pipeline structures being less than the threshold number, data management engine 242 purges, flags as unavailable, or partitions the related pipeline structures so that they are unavailable to the graphics pipeline cache reconstruction engine 240. By making pipeline structures available only when there exists a certain number of related pipeline structures, the likelihood that the pipeline structures identify the user information, client device information, and client gaming session information associated with the generation of the pipeline structure is reduced. According to embodiments, data management engine 242 is further configured to purge all of the pipeline structures in a pipeline structure library 250 periodically. For example, data management engine 242 purges all the pipeline structures in a pipeline structure library 250 at predetermined intervals of time including, as an example, seconds, minutes, hours, days, weeks, months, years, or any combination thereof, to name a few.

According to embodiments, data management engine 242 groups pipeline structures stored in a pipeline structure library 250 into one or more groupings. For example, data management engine 242 groups a predetermined number of randomly selected pipeline structures into a grouping. Note that the term "random" and its variants, as used herein with reference to the selection, also includes pseudo-random selection. In embodiments, data management engine 242 makes one or more groupings available to graphics pipeline cache reconstruction engine 240 for the construction of one or more graphics pipeline caches 236. As game platform instance 204 uses the pipeline caches constructed by graphics pipeline cache reconstruction engine 240 to support the gaming application, data management engine 242 measures, or observes, one or more performance metrics of the gaming application. Such performance metrics include, for example, frame rates, rendering times for graphical objects, lag times, network usage, resource usage, or any combination thereof, to name a few. In embodiments, data management engine 242 compares the observed performance metrics to one or more historical performance metrics. "Historical performance metrics," as used herein, include frame rates, rendering times for graphical objects, lag times, network usage, resource usage, or any combination thereof, associated with one or more previous client gaming sessions of the gaming application. According to embodiments, comparing the observed performance metrics to one or more historical performance metrics includes, for example, determining an average, median, mode, trend, pattern, or sequence based on the historical performance metrics. In response to the comparison of the observed performance metrics to the historical performance metrics indicating a decrease in the performance of the gaming application (e.g., a decrease in frame rate from the historical performance metrics), data management engine 242 purges the grouping from pipeline structure library 250 and generates one or more new groupings of pipeline structures. In response to the comparison of the observed performance metrics to the historical performance metrics indicating no change or improvement in the performance of the gaming application (i.e., the absence of any decrease in performance), data management engine 242 retains the grouping from pipeline structure library 250 for use in subsequent client gaming sessions of the gaming application.

Figure 3:
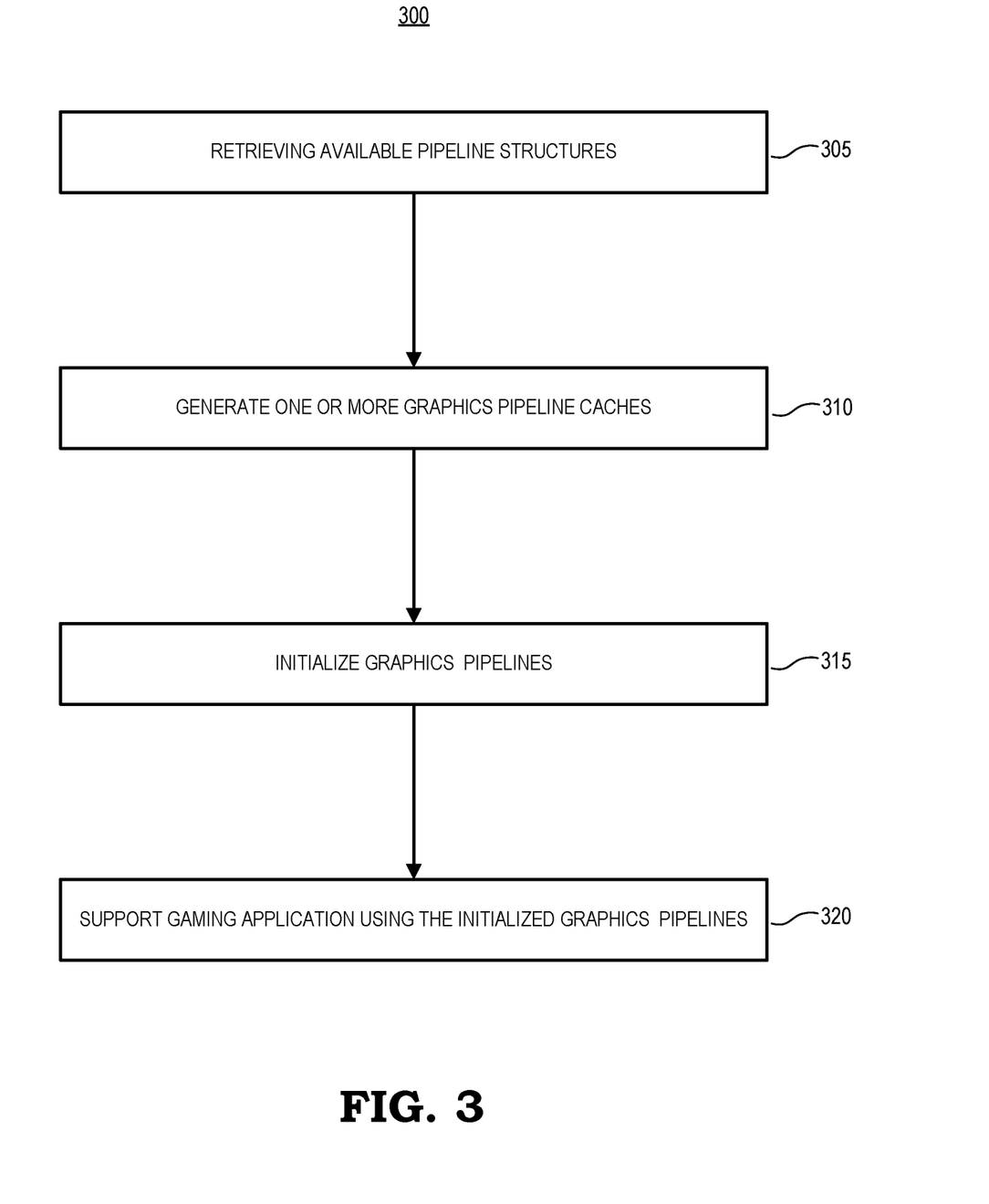
FIG. 3 is a flow diagram of an example reconstruction operation for one or more graphics pipeline caches using a pipeline structure library, in accordance with some embodiments.

Referring now to FIG. 3, an example pipeline cache reconstruction operation 300 is presented. For ease of illustration, the example pipeline cache reconstruction operation 300 is described with reference to the computing device 200 of FIG. 2 implemented as a server 102 in the cloud-based gaming system 100 of FIG. 1. At step 305 of operation 300, graphics pipeline construction engine 234 retrieves one or more available pipeline structures from pipeline structure library 250 associated with a gaming application to be supported by game platform instance 204. An "available pipeline structure," as used herein, includes a pipeline structure that data management engine 242 has made available or is part of a grouping generated by data management engine 242. In embodiments, an available pipeline structure includes a pipeline structure complying with one or more privacy policies implemented by data management engine 242. At step 310, graphics pipeline cache reconstruction engine 240 generates one or more graphics pipeline cache objects 238 based on the retrieved pipeline structures. Each graphics pipeline cache object 238 is representative of one or more outputs of a graphics pipeline compiled during a previous client gaming session of the gaming application (i.e., previous graphics pipeline). For example, each graphics pipeline cache object 238 is representative of data output by one or more stages of a previous graphics pipeline. From the graphics pipeline cache objects 238, graphics pipeline cache reconstruction engine 240 reconstructs or builds one or more graphics pipeline caches 236. At step 315, graphics pipeline construction engine 234 initializes one or more graphics pipelines based on the built graphics pipeline caches 236 for use by game platform instance 204 to support the gaming application. According to embodiments, the graphics pipelines initialized by graphics pipeline construction engine 234 can forgo compilation when rendering a graphical object. In this way, the time needed to render each graphical object in the virtual environment of the gaming application is reduced. At step 320, game platform instance 204 renders one or more graphical objects for use in the gaming application using the initialized graphics pipelines.

Figure 4:
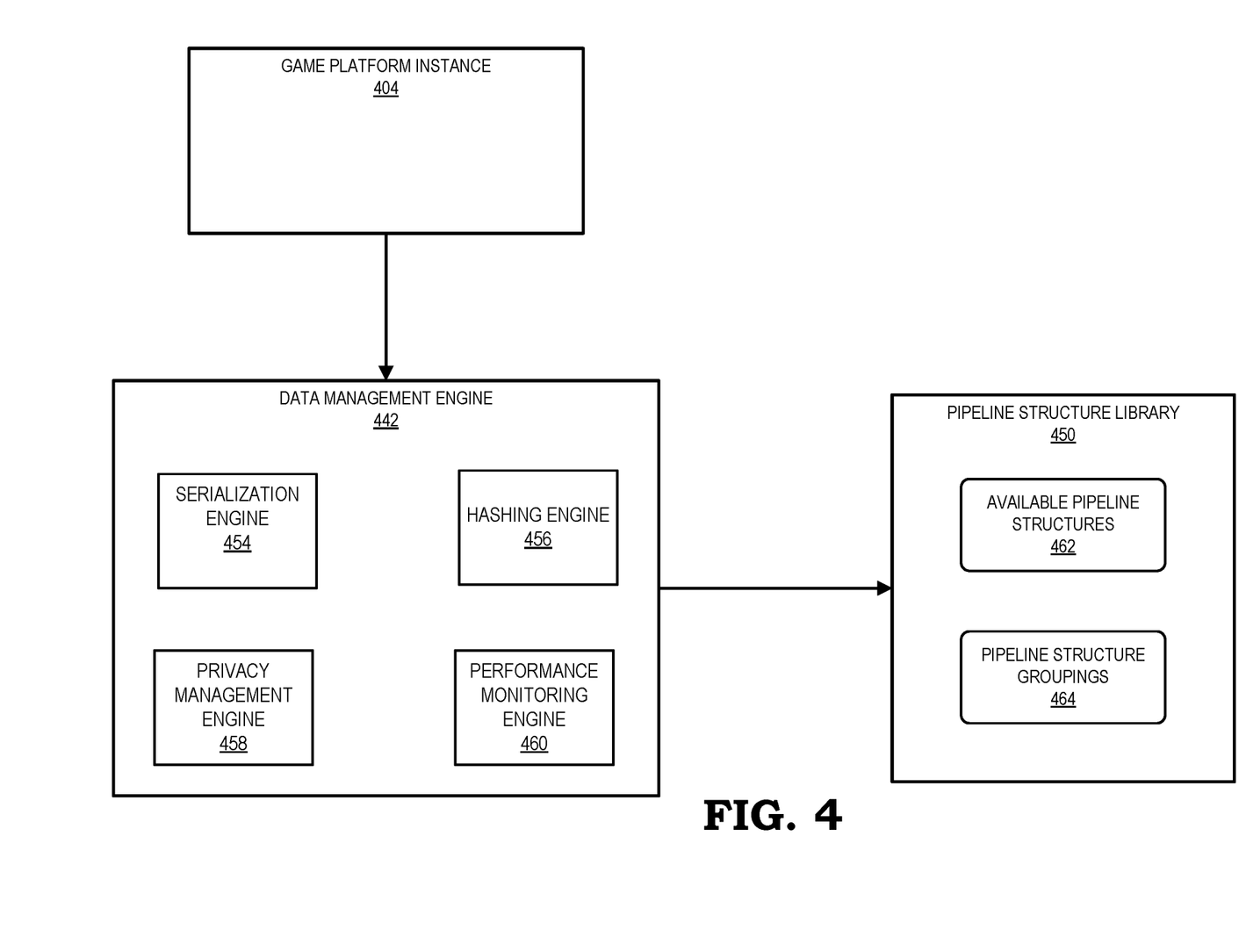
FIG. 4 is a block diagram of a data management engine configured to implement one or more privacy policies in a pipeline structure library, in accordance with some embodiments.
Figure 5:
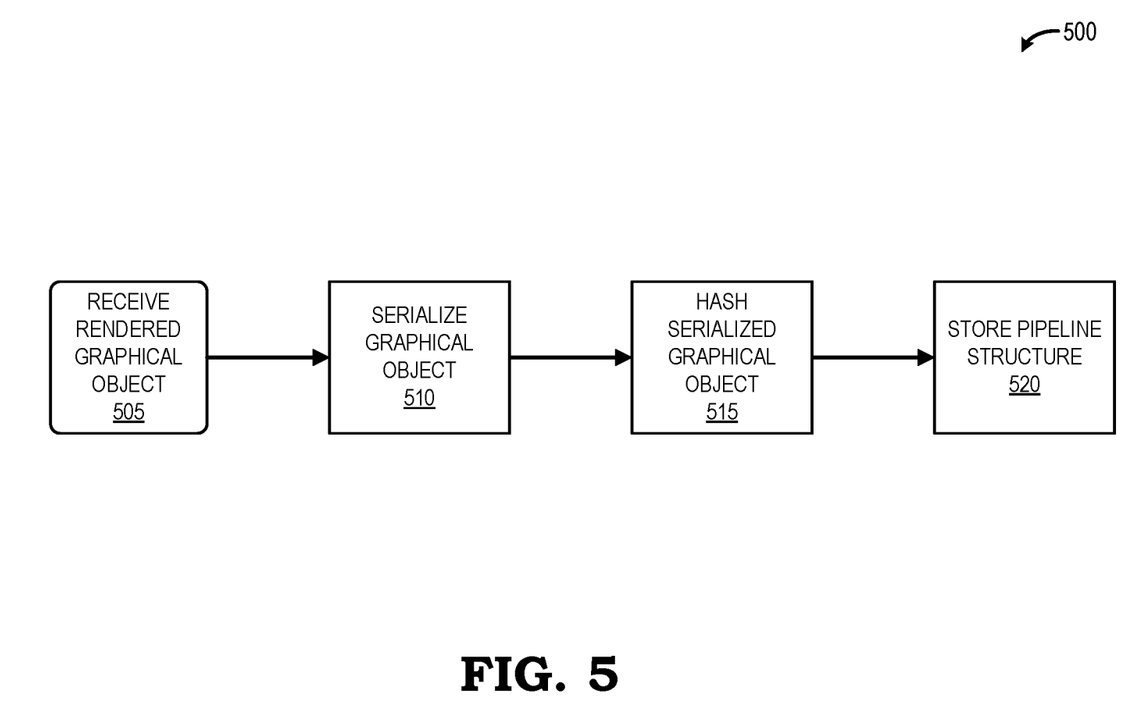
FIG. 5 is a flow diagram of an example pipeline structure creation operation for generating and storing one or more pipeline structures in a pipeline structure library, in accordance with some embodiments.

Referring now to FIG. 4, a block diagram of a data management engine for managing a pipeline structure library is presented. For ease of illustration, the data management engine is described with reference to the computing device 200 of FIG. 2 implemented as a server 102 of the system 100 of FIG. 1. In embodiments, data management engine 442, similar or the same as data management engine 242, includes hardware and software configured to generate one or more representations of rendered graphical objects that each include one or more data structures representing one or more graphics pipelines used to render a rendered graphical object. Data management engine 224 also includes serialization engine 454 including hardware and software configured to serialize the representations of the rendered graphical objects and hashing engine 456 that includes hardware and software configured to hash each serialized graphical object. In embodiments, data management engine 442 is configured to store representations of one or more graphical objects rendered by game platform instance 404, similar or the same as game platform instance 204, in pipeline structure library 450. In embodiments, data management engine 442 first serializes and hashes each representation of a rendered graphical object before storing it in pipeline structure library 450. For example, FIG. 5 illustrates a flow diagram for an example storage operation 500 of one or more pipeline structures. At step 505, data management engine 442 receives one or more rendered graphical objects from game platform instance 404 and generates one or more representations of the rendered graphical objects. At step 510, serialization engine 454 performs a serialization operating on each representation of a rendered graphical object to produce a serialized graphical structure. In embodiments, the serialization operation includes converting each representation of a rendered graphical object into a format storable in memory 248 and pipeline structure library 450. At step 515, hashing engine 456 hashes each serialized graphical structure such as by performing one or more hash functions (e.g., cyclic redundancy checks, checksums, non-cryptographic has functions, keyed cryptographic has functions, unkeyed cryptographic has functions) to produce one or more pipeline structures. In embodiments, hashing engine 456 helps ensure that each resulting pipeline structure does not include any identification information. For example, hashing engine 456 is configured to exclude any identification information from the hash functions. In other words, hashing engine 456 excludes data from each serialized graphical structure indicating the user, client gaming session, client device, or any combination thereof associated with the generation of the serialized graphical structure from the hash functions. At step 520, hashing engine 456 stores the produced pipeline structures in pipeline structure library 450.

According to embodiments, data management engine 442 includes privacy management engine 458 that includes hardware and software configured to implement one or more privacy policies for pipeline structure library 450. Such privacy policies include, for example, one or more requirements or processes for pipeline structures stored in the pipeline structure library 450 such as, for example, the anonymization of the stored pipeline structures, the periodic purging of pipeline structures, the comparison of pipeline structures to one or more predetermined thresholds, processes for grouping pipeline structures, or any combination thereof, to name a few. In embodiments, privacy management engine 458 is configured to determine the number of pipeline structures stored in pipeline structure library 450 each associated with the same rendered graphical object (i.e., related pipeline structures). That is to say, the number of related pipeline structures generated from the same rendered graphical object during their respective client gaming sessions. Privacy management engine 458 then compares the determined number to a threshold value and, based on the comparison, makes the related pipeline structures available so as to produce available pipeline structures 462. Making one or more pipeline structures available includes, for example, exposing the pipeline structures to graphics pipeline cache reconstruction engine 240, flagging the pipeline structures as available, partitioning the pipeline structures, or any combination thereof. In embodiments, privacy management engine 458 is configured to purge or erase all the pipeline structures stored in pipeline structure library 450 periodically. For example, privacy management engine 458 erases each pipeline structure stored in pipeline structure library 450 at predetermined time intervals that include, for example, seconds, minutes, hours, days, weeks, months, years, or any combination thereof.

Figure 6:
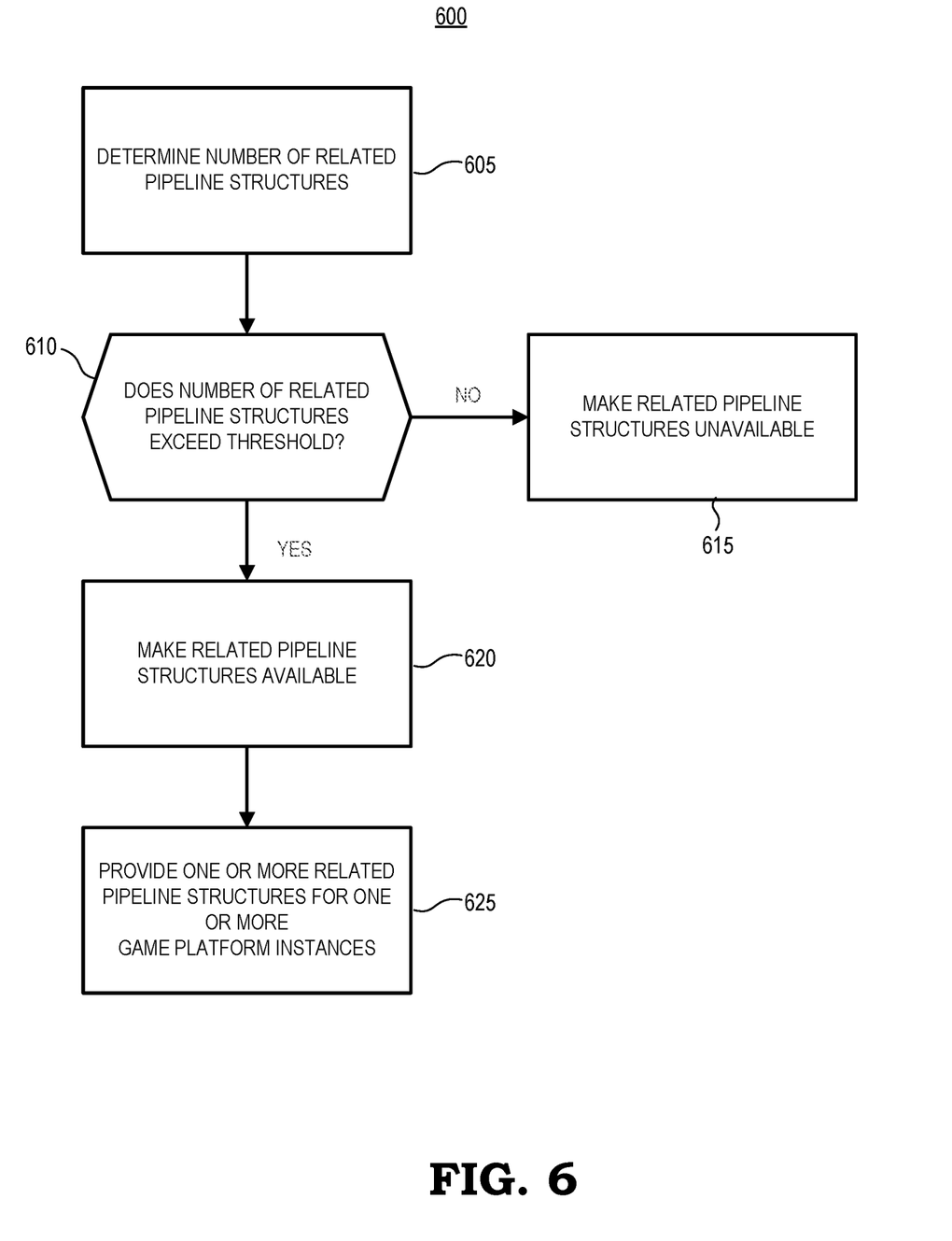
FIG. 6 is a flow diagram of an example privacy policy operation for implementing one or more privacy policies in a pipeline structure library, in accordance with some embodiments.

Referring now to FIG. 6, an illustration of a flow diagram of an example privacy policy operation 600 for a pipeline structure library is presented. For ease of illustration, the operation 600 is described with reference to the computing device 200 of FIG. 2 implemented as a server 102 of the system 100 of FIG. 1. At step 605, a privacy management engine, similar or the same as privacy management engine 458, determines a number of pipeline structures stored in a pipeline structure library, similar or the same as pipeline structure library 450, associated with the same rendered graphical object (also referred to herein as "a number of related pipeline structures"). At step 610, the privacy management engine compares the determined number of related pipeline structures to a predetermined threshold number. In embodiments, a privacy policy implemented by the privacy management engine indicates the predetermined threshold number. At step 615, in response to the number of related pipeline structures being less than the predetermined threshold number, the privacy management engines makes the related pipeline structures unavailable to a graphics pipeline cache reconstruction engine (e.g., graphics pipeline cache reconstruction engine 240) such as, for example, by purging, flagging as unavailable, or partitioning the pipeline structures within the pipeline structure library. At step 620, in response to the number of related pipeline structures being equal to or exceeding the predetermined threshold number, the privacy management engine makes the related pipeline structures available to the pipeline cache reconstruction engine such as, for example, by exposing the pipeline structures to graphics pipeline cache reconstruction engine, flagging the pipeline structures as available, partitioning the pipeline structures within the pipeline structure library, or any combination thereof. At step 625, at least one of the related pipeline structures is provided to the graphics pipeline cache reconstruction engine for use in a new client gaming session of the gaming application supported by a game platform instance, similar or the same as game platform instance 204.

Referring again to FIG. 4, privacy management engine 458 is further configured to group one or more unrelated pipeline structures into one or more pipeline structure groupings 464. "Unrelated pipeline structures," as used herein, are pipeline structures each representative of different, distinct rendered graphical objects of a gaming application. In embodiments, privacy management engine 458 groups the unrelated pipeline structures randomly (that is, fully randomly or pseudo-randomly). According to embodiments, privacy management engine 458 is configured to provide one or more pipeline structure groupings to a graphics pipeline cache reconstruction engine, similar or the same as graphics pipeline cache reconstruction engine 240, so that one or more pipeline caches can be built for game platform instance 404 to support the gaming application for a new client gaming session. In embodiments, data management engine 442 includes performance monitoring engine 460 that includes hardware and software configured to monitor (i.e., observe) one or more performance metrics of the gaming application supported by game platform instance 404 for the new gaming session. Such performance metrics include, for example, game crash rates, frame rates, rendering times for graphical objects, lag times, network usage, resource usage, or any combination thereof, to name a few. In embodiments, performance monitoring engine 460 is configured to compare the observed performance metrics for the gaming application during a new client gaming session to historical performance metrics (i.e., game crash rates, frame rates, rendering times for graphical objects, lag times, network usage, resource usage, or any combination thereof, associated with the gaming application during one more previous client gaming sessions). According to embodiments, performance monitoring engine 460 determines an average, median, mode, trend, pattern, or sequence based on the historical performance metrics when comparing the observed performance metrics to the historical performance metrics. For example, performance monitoring engine 460 compares an observed frame rate to an average historical frame rate determined from one or more historical performance metrics. In response to the comparison of the observed performance metrics to one or more historical performance metrics indicating a decrease in performance of the gaming application, privacy management engine 458 purges the groupings supplied for the new client gaming session from pipeline structure library 250 and generates one or more new groupings of pipeline structures. In response to the comparison of the observed performance metrics to one or more historical performance metrics indicating no change or an increase in performance of the gaming application (i.e., indicating the absence of a decrease in performance), privacy management engine 458 maintains the groupings supplied for the new client gaming session in pipeline structure library 450.

Figure 7:
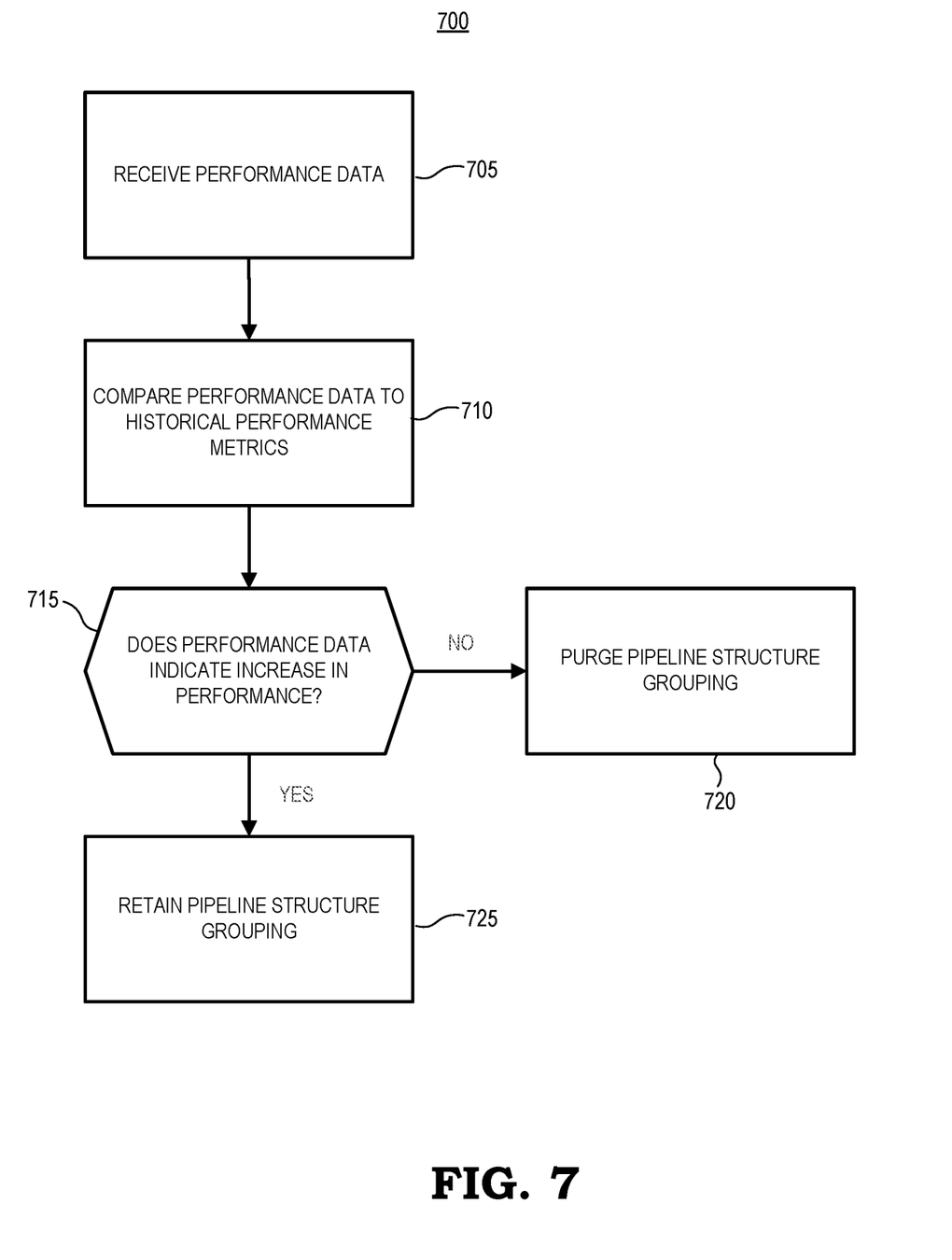
FIG. 7 is a flow diagram of a grouping operation grouping one or more related pipeline structures, in accordance with some embodiments.

Referring now to FIG. 7, a flow diagrams of an example grouping operation 700 for pipeline structures is presented. For ease of illustration, the operation 700 is described with reference to the computing device 200 of FIG. 2 implemented as a server 102 of the system 100 of FIG. 1. At step 705, a game platform instance, similar to or the same as game platform instance 204, supports a gaming application for a current client gaming session. The game platform instance supports the gaming application using a graphics pipeline cache, similar or the same as graphics pipeline cache 236, built by a graphics pipeline cache reconstruction engine, similar or the same as graphics pipeline cache reconstruction engine 240 and based on one or more groupings of unrelated pipeline structures. Further at step 705, a performance monitoring engine, similar or the same as performance monitoring engine 460, receives performance data indicating one or more observed performance metrics of the gaming application. At step 710, the performance monitoring engine compares the observed performance metrics to one or more historical performance metrics. In embodiments, comparing the observed performance metrics to the historical performance metrics includes determining an average, mode, median, trend, pattern, sequence, or any combination thereof based on the historical performance metrics. At step 715, the performance monitoring engine determines whether the comparison of the observed performance metrics to the historical performance metrics indicates an increase or decrease in performance of the gaming application compared to previous client gaming sessions. For example, determining whether the comparison indicates a decrease in frame rate, bandwidth, or both when compared to previous client gaming sessions. At step 720, in response to the comparison of the observed performance metrics to the historical performance metrics indicating a decrease in performance compared to previous client gaming sessions, the performance monitoring engine is configured to purge the groupings of unrelated pipeline structures supplied to the game platform instance for the current gaming session. At step 725, in response to the comparison of the observed performance metrics to the historical performance metrics indicating an increase in performance compared to previous client gaming sessions, the performance monitoring engine is configured to retain the groupings of unrelated pipeline structures in the pipeline structure library.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or other instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still, further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

The preposition "or" as used in the context of "at least one of A, B, or C", is herein used to signify an "inclusive or." That is to say, in the above and similar contexts, or is used to signify "at least one of or any combination thereof." For example, "at least one of A, B, and C" is used to signify "at least one of A, B, C, or any combination thereof."

Benefits, other advantages, and solutions to problems have been described above with regard to specific embodiments. However, the benefits, advantages, solutions to problems and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
    storing a plurality of pipeline structures in a pipeline structure library associated with an application, wherein each pipeline structure of the plurality of pipeline structures represents a respective previously rendered graphical object for the application rendered using a graphics pipeline; and
    designating at least one pipeline structure of the plurality of pipeline structures as available to a computing device executing the application for initializing the graphics pipeline, wherein designating the at least one pipeline as available is based on a number of related pipeline structures in the plurality of pipeline structures.

2. The method of claim 1, further comprising:
in response to the number of related pipeline structures in the plurality of pipeline structures being equal to or exceeding a predetermined threshold number, designating the at least one pipeline structure as available.

3. The method of claim 1, further comprising:
in response to the number of related pipeline structures in the plurality of pipeline structures being equal to or exceeding a predetermined threshold number, purging the at least one pipeline structure from the pipeline structure library.

4. The method of claim 1, further comprising:
generating a representation of a rendered graphical object associated with a client session, wherein the representation of the rendered graphical object indicates the graphics pipeline associated with the rendered graphical object.

5. The method of claim 4, further comprising:
hashing the representation of the rendered graphical object to produce a pipeline structure of the plurality of pipeline structures.

6. The method of claim 4, wherein hashing the representation of the rendered graphical object includes removing data indicating the client session from the representation of the rendered graphical object.

7. The method of claim 1, further comprising:
purging the plurality of pipeline structures from the pipeline structure library after a predetermined amount of time has elapsed.

8. A system, comprising:
a memory configured to store a pipeline structure library associated with an application, wherein the pipeline structure library includes a plurality of pipeline structures each representing a respective previously rendered graphical object for the application rendered using a graphics pipeline; and
a processor coupled to the memory and configured to designate at least one pipeline structure of the plurality of pipeline structures as available to a computing device executing the application for initializing the graphics pipeline, wherein designating the at least one pipeline as available is based on a number of related pipeline structures in the plurality of pipeline structures.

9. The system of claim 8, wherein the processor is configured to:
in response to the number of related pipeline structures in the plurality of pipeline structures being equal to or exceeding a predetermined threshold number, designate the at least one pipeline structure as available.

10. The system of claim 8, wherein the processor is configured to:
in response to the number of related pipeline structures in the plurality of pipeline structures being equal to or exceeding a predetermined threshold number, purge the at least one pipeline structure from the pipeline structure library.

11. The system of claim 8, wherein the processor is configured to:
generate a representation of a rendered graphical object associated with a client session, wherein the representation of the rendered graphical object indicates the graphics pipeline associated with the rendered graphical object.

12. The system of claim 11, wherein the processor is configured to:
hash the representation of the rendered graphical object for the application to produce a pipeline structure of the plurality of pipeline structures.

13. The system of claim 12, wherein hashing the representation of the rendered graphical object includes removing data indicating the client session from the representation of the rendered graphical object.

14. The system of claim 8, wherein the processor is configured to:
purge the plurality of pipeline structures from the pipeline structure library after a predetermined amount of time has elapsed.

15. A system, comprising:
a memory configured to store a pipeline structure library associated with an application, wherein the pipeline structure library includes a plurality of pipeline structures each representing a respective previously rendered graphical object for the application rendered using a graphics pipeline; and
a processor coupled to the memory and configured to:
group two or more pipeline structures of the plurality of pipeline structures to produce a pipeline structure grouping; and
designate the pipeline structure grouping as available to a computing device executing the application for initializing the graphics pipeline.

16. The system of claim 15, wherein the processor is configured to randomly group the two or more pipeline structures to produce the pipeline structure grouping.

17. The system of claim 15, wherein the processor is configured to measure one or more performance metrics associated with the computing device executing the application.

18. The system of claim 17, wherein the processor is configured to purge the pipeline structure grouping from the pipeline structure library based on the one or more performance metrics.

19. The system of claim 18, wherein the processor is configured to, in response to purging the pipeline structure grouping from the pipeline structure library, group two or more other pipeline structures of the plurality of pipeline structures to produce a second pipeline structure grouping.

20. The system of claim 15, wherein each pipeline structure of the pipeline structure grouping represents a respective and distinct previously rendered graphical object for the application.

* * * * *